(12) United States Patent
Suzuki et al.

(10) Patent No.: US 10,814,517 B2
(45) Date of Patent: Oct. 27, 2020

(54) CHAIN SAW

(71) Applicant: MAKITA CORPORATION, Anjo-shi, Aichi (JP)

(72) Inventors: Daisuke Suzuki, Anjo (JP); Takuma Niiyama, Anjo (JP)

(73) Assignee: MAKITA CORPORATION, Anjo-shi, Aichi (JP)

( * ) Notice: Subject to any disclaimer, the term of this patent is extended or adjusted under 35 U.S.C. 154(b) by 0 days.

(21) Appl. No.: 16/157,387

(22) Filed: Oct. 11, 2018

(65) Prior Publication Data
US 2019/0111582 A1 Apr. 18, 2019

(30) Foreign Application Priority Data

| Oct. 13, 2017 | (JP) | 2017-199839 |
| Oct. 13, 2017 | (JP) | 2017-199840 |
| Oct. 13, 2017 | (JP) | 2017-199841 |
| Oct. 13, 2017 | (JP) | 2017-199842 |

(51) Int. Cl.
| *B27B 17/12* | (2006.01) |
| *A01G 3/08* | (2006.01) |
| *B27B 17/02* | (2006.01) |
| *B27B 17/00* | (2006.01) |
| *B27B 17/08* | (2006.01) |
| *B27B 17/14* | (2006.01) |

(52) U.S. Cl.
CPC ............. *B27B 17/12* (2013.01); *A01G 3/086* (2013.01); *B27B 17/0008* (2013.01); *B27B 17/02* (2013.01); *B27B 17/08* (2013.01); *B27B 17/14* (2013.01)

(58) Field of Classification Search
CPC ...... B27B 17/12; B27B 17/14; B27B 17/0008; B27B 17/08; B27B 17/02; A01G 3/086
USPC ..................................................... 30/381, 382
See application file for complete search history.

(56) References Cited

U.S. PATENT DOCUMENTS

| 8,353,362 | B2* | 1/2013 | Liebhard | A01G 3/053 |
| | | | | 173/170 |
| 8,723,453 | B2* | 5/2014 | Rosskamp | H02P 23/26 |
| | | | | 318/17 |
| 8,833,221 | B2* | 9/2014 | Tomita | B27G 19/003 |
| | | | | 83/788 |
| 2011/0197389 | A1* | 8/2011 | Ota | H01M 10/488 |
| | | | | 15/339 |

(Continued)

FOREIGN PATENT DOCUMENTS

| JP | 2014-037080 A | 2/2014 |
| JP | 2016-040454 A | 3/2016 |
| JP | 2017-105206 A | 6/2017 |

*Primary Examiner* — Hwei-Siu C Payer
(74) *Attorney, Agent, or Firm* — Sughrue Mion, PLLC

(57) ABSTRACT

A chain saw disclosed herein may include a motor configured to rotate a saw chain about a guide bar, a control unit configured to control a voltage applied to the motor, a body housing that houses the motor and the control unit, a battery detachably attached to the body housing, and a top handle provided above the body housing. The control unit may be disposed above the battery. In a rear view of the chain saw in a state where the chain saw is placed on a mount surface, the battery and the control unit may not overlap. In a top view of the chain saw in the state where the chain saw is placed on the mount surface, the battery and the control unit may overlap at least partially.

12 Claims, 10 Drawing Sheets

(56) References Cited

U.S. PATENT DOCUMENTS

| | | | |
|---|---|---|---|
| 2013/0020102 A1* | 1/2013 | Bjornlinger | B25F 5/00 173/2 |
| 2013/0200837 A1* | 8/2013 | Oerding | A01D 69/02 318/504 |
| 2014/0047722 A1 | 2/2014 | Onose et al. | |
| 2015/0165640 A1* | 6/2015 | Ro kamp | A01G 3/053 30/381 |
| 2015/0375416 A1* | 12/2015 | Haneda | B27B 17/00 30/383 |
| 2016/0047401 A1 | 2/2016 | Takayanagi et al. | |
| 2017/0259452 A1* | 9/2017 | Kachi | B27B 17/02 |
| 2018/0013329 A1* | 1/2018 | Aoyama | H02K 3/12 |
| 2019/0111582 A1* | 4/2019 | Suzuki | A01G 3/086 |

* cited by examiner

CHAIN SAW

CROSS-REFERENCE

This application claims priority to Japanese Patent Application No. 2017-199839, filed on Oct. 13, 2017, Japanese Patent Application No. 2017-199840, filed on Oct. 13, 2017, Japanese Patent Application No. 2017-199841, filed on Oct. 13, 2017, and Japanese Patent Application No. 2017-199842, filed on Oct. 13, 2017, the entire contents of which are incorporated herein by reference.

TECHNICAL FIELD

The technique disclosed herein relates to a chain saw.

BACKGROUND

Japanese Patent Application Publication No. 2014-37080 describes a chain saw. This chain saw is provided with a motor configured to rotate a saw chain about a guide bar, a control unit configured to control a voltage applied to the motor, a body housing that houses the motor and the control unit, a battery detachably attached to the body housing, and a top handle provide above the body housing.

Japanese Patent Application Publication No. 2016-40454 describes a chain saw. This chain saw is provided with a motor configured to rotate a saw chain about a guide bar, an oil pump configured to supply lubricant to the saw chain in conjunction with rotation of the motor, and a body housing that houses the motor and the oil pump. The chain saw further includes a discharge amount adjusting mechanism including an adjusting member configured to adjust a discharge amount of the lubricant in the oil pump. The discharge amount adjusting mechanism further includes an adjustment opening provided at the body housing and allowing a tool for operating the adjusting member to pass therethrough. The adjustment opening is provided at a lower surface of the body housing.

Japanese Patent Application Publication No. 2017-105206 describes a chain saw. This chain saw is provided with a prime mover configured to rotate a saw chain about a guide bar, a sprocket configured to transmit rotation of the prime mover to the saw chain, a body housing that houses the prime mover, a sprocket cover covering the sprocket, and a top handle provided above the body housing.

SUMMARY

Chain saws of the conventional techniques have room for improvement regarding their layouts of components inside their body housings, and the sizes of the body housings have been large. The disclosure herein provides a technique that enables further reduction in a size of a body housing.

Further, in the chain saw of the conventional technique, the adjustment opening is provided at the lower surface of the body housing, so a user has to operate the adjusting member by inserting a tool from a lower surface side of the chain saw upon when adjusting a discharge amount of lubricant, and there has been a problem regarding workability. The disclosure herein provides another technique that enables work for adjusting a discharge amount of lubricant to be performed easier.

Moreover, in the chain saws of the conventional techniques, the top handle and the guide bar are disposed relatively apart from each other in a left-right direction, so it was difficult for the user to intuitively acknowledge a cutting position by the saw chain upon when the user holds the top handle. The disclosure herein provides another technique that allows a user to intuitively acknowledge a cutting position by a saw chain when the user holds a top handle.

A chain saw disclosed herein may comprise a motor configured to rotate a saw chain about a guide bar, a control unit configured to control a voltage applied to the motor, a body housing that houses the motor and the control unit, a battery detachably attached to the body housing, and a top handle provided above the body housing. The control unit may be disposed above the battery. In a rear view of the chain saw in a state where the chain saw is placed on a mount surface, the battery and the control unit may not overlap. In a top view of the chain saw in the state where the chain saw is placed on the mount surface, the battery and the control unit may overlap at least partially.

According to the above configuration, a size of the body housing in a front-rear direction can be made small, as compared to a case where the control unit and the battery are disposed to be offset from each other in the front-rear direction so that they do not overlap.

Another chain saw disclosed herein may comprise a motor configured to rotate a saw chain about a guide bar, a control unit configured to control a voltage applied to the motor, a body housing that houses the motor and the control unit, a battery detachably attached to the body housing, and a top handle provided above the body housing. In a top view of the chain saw in a state where the chain saw is placed on a mount surface, the motor and the battery may not overlap, and the motor and the control unit may not overlap. In a rear view of the chain saw in the state where the chain saw is placed on the mount surface, the motor and the battery may overlap at least partially, and the motor and the control unit may overlap at least partially.

In a chain saw provided with a motor, an output shaft of the motor is disposed along a left-right direction of the chain saw in many cases. In such cases, if a battery and a control unit are disposed above or below the motor inside a body housing, the size of the body housing in an up-down direction becomes large. According to the above configuration, since the battery and the control unit are not disposed above or below the motor inside the body housing, the size of the body housing in the up-down direction can be made smaller. Further, according to the above configuration, in the rear view of the chain saw, the motor and the battery overlap at least partially and the motor and the control unit overlap at least partially, so the size of the body housing in the left-right direction can also be made smaller.

Yet another chain saw disclosed herein may comprise a motor configured to rotate a saw chain about a guide bar, an oil pump configured to supply lubricant to the saw chain in conjunction with rotation of the motor, a body housing that houses the motor and the oil pump, and a discharge amount adjusting mechanism including an adjusting member configured to adjust a discharge amount of the lubricant in the oil pump. The discharge amount adjusting mechanism may be disposed at a surface of the body housing that is exposed to outside in a state where the chain saw is placed on a mount surface.

According to the above configuration, since the discharge amount adjusting mechanism is disposed at the surface of the body housing that is exposed to outside in the state where the chain saw is placed on the mount surface, a user can operate the adjusting member in the state where the chain saw is placed on the mount surface when adjusting a discharge amount of lubricant. Work for adjusting the discharge amount of the lubricant can be performed easily.

Yet another chain saw disclosed herein may comprise a prime mover configured to rotate a saw chain about a guide bar, a sprocket configured to transmit rotation of the prime mover to the saw chain, a body housing that houses the prime mover, a sprocket cover covering the sprocket, and a top handle provided above the body housing. In a top view of the chain saw in a state where the chain saw is placed on a mount surface, a ratio of a distance between a right end surface of the top handle and a center line of the guide bar to a distance between the right end surface of the top handle and a right end surface of the sprocket cover may be 0.3 or less.

According to the above configuration, since the top handle and the guide bar are disposed relatively close to each other in the left-right direction, the user can more easily acknowledge intuitively a cutting position by the saw chain when the user holds the top handle. Further, according to the above configuration, a center of gravity of the guide bar is located at a position close to the top handle in the left-right direction of the chain saw, and thus is located at a position close to a center of gravity of the chain saw. Due to this, the position of the center of gravity of the chain saw can be suppressed from varying in the left-right direction of the chain saw even in a case where a different type of guide bar is attached.

DETAILED DESCRIPTION

Figure 1:
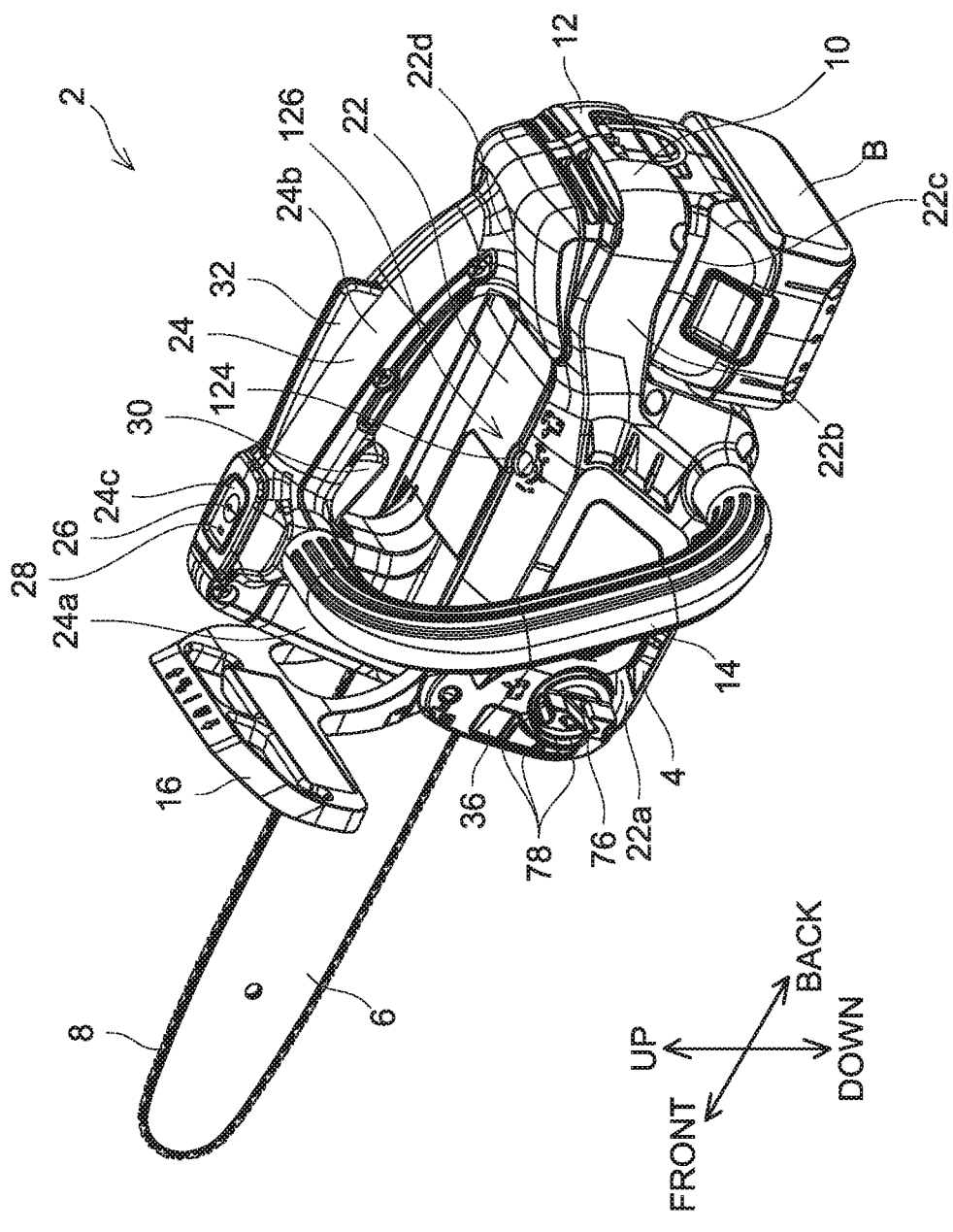
FIG. 1 is a perspective view of a chain saw 2 of an embodiment.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved chain saws, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, a chain saw may comprise a motor configured to rotate a saw chain about a guide bar, a control unit configured to control a voltage applied to the motor, a body housing that houses the motor and the control unit, a battery detachably attached to the body housing, and a top handle provided above the body housing. The control unit may be disposed above the battery. In a rear view of the chain saw in a state where the chain saw is placed on a mount surface, the battery and the control unit may not overlap. In a top view of the chain saw in the state where the chain saw is placed on the mount surface, the battery and the control unit may overlap at least partially.

According to the above configuration, a size of the body housing in a front-rear direction can be made small as compared to a case where the control unit and the battery are disposed to be offset from each other in the front-rear direction so that they do not overlap.

In one or more embodiments, a hand rest may be provided in a vicinity of a portion of the body housing where a rear end of the top handle connects to the body housing. The control unit may be disposed inside the hand rest.

According to the above configuration, convenience for a user can be improved by providing the hand rest in the vicinity of the portion of the body housing where the rear end of the top handle connects to the body housing. Further, according to the above configuration, an internal space in the hand rest can be efficiently used by disposing the control unit in the internal space of the hand rest of the body housing, by which the size of the body housing can further be made smaller.

In one or more embodiments, in the rear view of the chain saw in the state where the chain saw is placed on the mount surface, the top handle and the battery may not overlap. In the top view of the chain saw in the state where the chain saw is placed on the mount surface, the top handle and the battery may overlap at least partially.

According to the above configuration, the control unit is disposed in a space between the top handle and the battery inside the body housing. According to the above configuration, the size of the body housing in the front-rear direction can be made small as compared to a case where the top handle and the battery are disposed to be offset from each other in the front-rear direction so that they do not overlap.

In one or more embodiments, the battery may be detachable by being slid in a left-right direction relative to the body housing.

According to the above configuration, the size of the body housing in the front-rear direction can be made small as compared to a case where the battery is configured to be detachable by being slid in the front-rear direction relative to the body housing.

In one or more embodiments, a chain saw may comprise a motor configured to rotate a saw chain about a guide bar, a control unit configured to control a voltage applied to the motor, a body housing that houses the motor and the control unit, a battery detachably attached to the body housing, and a top handle provided above the body housing. In a top view of the chain saw in a state where the chain saw is placed on a mount surface, the motor and the battery may not overlap, and the motor and the control unit may not overlap. In a rear view of the chain saw in the state where the chain saw is placed on the mount surface, the motor and the battery may overlap at least partially, and the motor and the control unit may overlap at least partially.

In a chain saw provided with a motor, an output shaft of the motor is disposed along a left-right direction of the chain saw in many cases. In such cases, if a battery and a control unit are disposed above or below the motor inside a body housing, the size of the body housing in an up-down direction becomes large. According to the above configuration, since the battery and the control unit are not disposed above or below the motor inside the body housing, the size of the body housing in the up-down direction can be made smaller. Further, according to the above configuration, in the rear view of the chain saw, the motor and the battery overlap at least partially and the motor and the control unit overlap at least partially, so the size of the body housing in the left-right direction can also be made smaller.

In one or more embodiments, the battery and the control unit may be disposed on a rear side relative to the motor.

According to the above configuration, the battery can be attached and detached on the rear side of the body housing, which is a position separated away from the guide bar, and work performed by the user to attach and detach the battery becomes easier. Further, according to the above configuration, since both the battery and the control unit are disposed on the rear side relative to the motor, the size of the body housing in the front-rear direction can further be made smaller.

In one or more embodiments, in the top view of the chain saw in the state where the chain saw is placed on the mount surface, the motor may be disposed within a range of 1.2 times a width of the battery in a left-right direction from a center line of the battery in the left-right direction.

According to the above configuration, the size of the body housing in the left-right direction can be made small as compared to a case where the battery and the motor are disposed to be offset greatly from each other in the left-right direction of the chain saw.

In one or more embodiments, a chain saw may comprise a motor configured to rotate a saw chain about a guide bar, an oil pump configured to supply lubricant to the saw chain in conjunction with rotation of the motor, a body housing that houses the motor and the oil pump, and a discharge amount adjusting mechanism including an adjusting member configured to adjust a discharge amount of the lubricant in the oil pump. The discharge amount adjusting mechanism may be disposed at a surface of the body housing that is exposed to outside in a state where the chain saw is placed on a mount surface.

According to the above configuration, since the discharge amount adjusting mechanism is disposed on the surface of the body housing that is exposed to outside in the state where the chain saw is placed on the mount surface, the user can operate the adjusting member in the state where the chain saw is placed on the mount surface when adjusting the discharge amount of the lubricant. Work of adjusting the discharge amount of the lubricant can easily be performed.

In one or more embodiments, the chain saw may further comprise a top handle provided above the body housing. The discharge amount adjusting mechanism may be disposed on a left side relative to the top handle.

According to the above configuration, when adjusting the discharge amount of the lubricant, the user can operate the adjusting member with his/her left hand even while holding the chain saw by gripping the top handle with his/her right hand. The work of adjusting the discharge amount of the lubricant can easily be performed.

In one or more embodiments, the oil pump may be disposed on the left side relative to the motor.

If the oil pump is disposed on a right side relative to the motor and the discharge amount adjusting mechanism is disposed on a left side relative to the top handle, the discharge amount adjusting mechanism has to be configured with a complex structure. According to the above configuration, since the oil pump is disposed on the left side relative to the motor and the discharge amount adjusting mechanism is disposed on the left side relative to the top handle, the discharge amount adjusting mechanism can be configured with a simple structure.

In one or more embodiments, the chain saw may further comprise a side handle provided on the left side relative to the body housing. The discharge amount adjusting mechanism may be disposed on a rear side relative to a front end of the side handle.

According to the above configuration, the side handle will not interfere when the user operates the adjusting member. The work of adjusting the discharge amount of the lubricant can more easily be performed.

In one or more embodiments, the discharge amount adjusting mechanism may be disposed at an upper surface of the body housing.

According to the above configuration, the user can visually recognize the adjusting member without bending his/her body or lifting the chain saw to a level of his/her eyes. Due to this, the user can more easily perform the work of operating the adjusting member.

In one or more embodiments, the adjusting member may be disposed inside the body housing. The discharge amount adjusting mechanism may further include an adjustment opening provided at the body housing and allowing a tool for operating the adjusting member to pass therethrough.

According to the above configuration, since the adjusting member is disposed inside the body housing, the adjusting member can be prevented from being operated by mistake.

In one or more embodiments, a chain saw may comprise a prime mover configured to rotate a saw chain about a guide bar, a sprocket configured to transmit rotation of the prime mover to the saw chain, a body housing that houses the prime mover, a sprocket cover covering the sprocket, and a top handle provided above the body housing. In a top view of the chain saw in a state where the chain saw is placed on a mount surface, a ratio of a distance between a right end surface of the top handle and a center line of the guide bar to a distance between the right end surface of the top handle and a right end surface of the sprocket cover may be 0.3 or less.

According to the above configuration, since the top handle and the guide bar are disposed relatively close to each other in the left-right direction, the user can more easily acknowledge a cutting position by the saw chain intuitively upon when the user grips the top handle. Further, according to the above configuration, in the left-right direction of the chain saw, a center of gravity of the guide bar is located at a position close to the top handle, and thus is located at a position close to a center of gravity of the chain saw. Due to this, even when a different type of guide bar is attached, a position of the center of gravity of the chain saw can be suppressed from varying in the left-right direction of the chain saw.

In one or more embodiments, in the top view of the chain saw in the state where the chain saw is placed on the mount surface, a center of gravity of the chain saw may be disposed within a range of twice a width of the top handle in a left-right direction from a center line of the top handle in the left-right direction.

According to the above configuration, when the user grips the top handle with his/her right hand to hold the chain saw, the chain saw is less likely to tilt leftward or rightward. Workability of cutting work using the chain saw can be improved.

In one or more embodiments, the prime mover may be a motor.

Since a motor has a simple structure as compared to other prime movers such as an engine, the position of the center of gravity can easily be identified in designing the chain saw, and its attachment position inside the body housing can easily be adjusted. According to the above configuration, the center of gravity of the chain saw can be located in the vicinity of the top handle in the left-right direction of the chain saw by balancing a weight of the guide bar and a weight of the motor.

In one or more embodiments, the chain saw may further comprise a battery detachably attached to the body housing.

Unlike a case of supplying power with a power cord, in a case where power is supplied by a battery, the battery attached to the body housing can be used as a weight for adjusting the position of the center of gravity of the chain saw. According to the above configuration, the center of gravity of the chain saw can be located in the vicinity of the top handle in the left-right direction of the chain saw by balancing the weight of the guide bar, the weight of the motor, and a weight of the battery.

(Embodiment)

As shown in FIG. 1, a chain saw 2 of a present embodiment comprises a main body 4, a guide bar 6, and a saw chain 8. The guide bar 6 is an elongate plate-like member that is attached to the main body 4 to protrude forward from the main body 4. The saw chain 8 is provided with a plurality of cutters which are connected to each other, and is attached along a periphery of the guide bar 6. The main body 4 has a battery B attached thereto. The chain saw 2 is configured to cut an object such as wood by driving the saw chain 8 to rotate along the periphery of the guide bar 6 with power supplied from the battery B. Hereinbelow, when the chain saw 2 is placed on a mount surface P (see FIG. 2) such as a ground surface, a direction perpendicularly intersecting the mount surface P will be termed an up-down direction of the chain saw 2, a direction projecting a longitudinal direction of the guide bar 6 to the mount surface P will be termed a front-rear direction of the chain saw 2, and a direction perpendicularly intersecting the up-down direction and the front-rear direction of the chain saw 2 will be termed a left-right direction of the chain saw 2. In the drawings other than FIG. 1, depiction of the saw chain 8 is omitted for clearer illustration.

Figure 2:
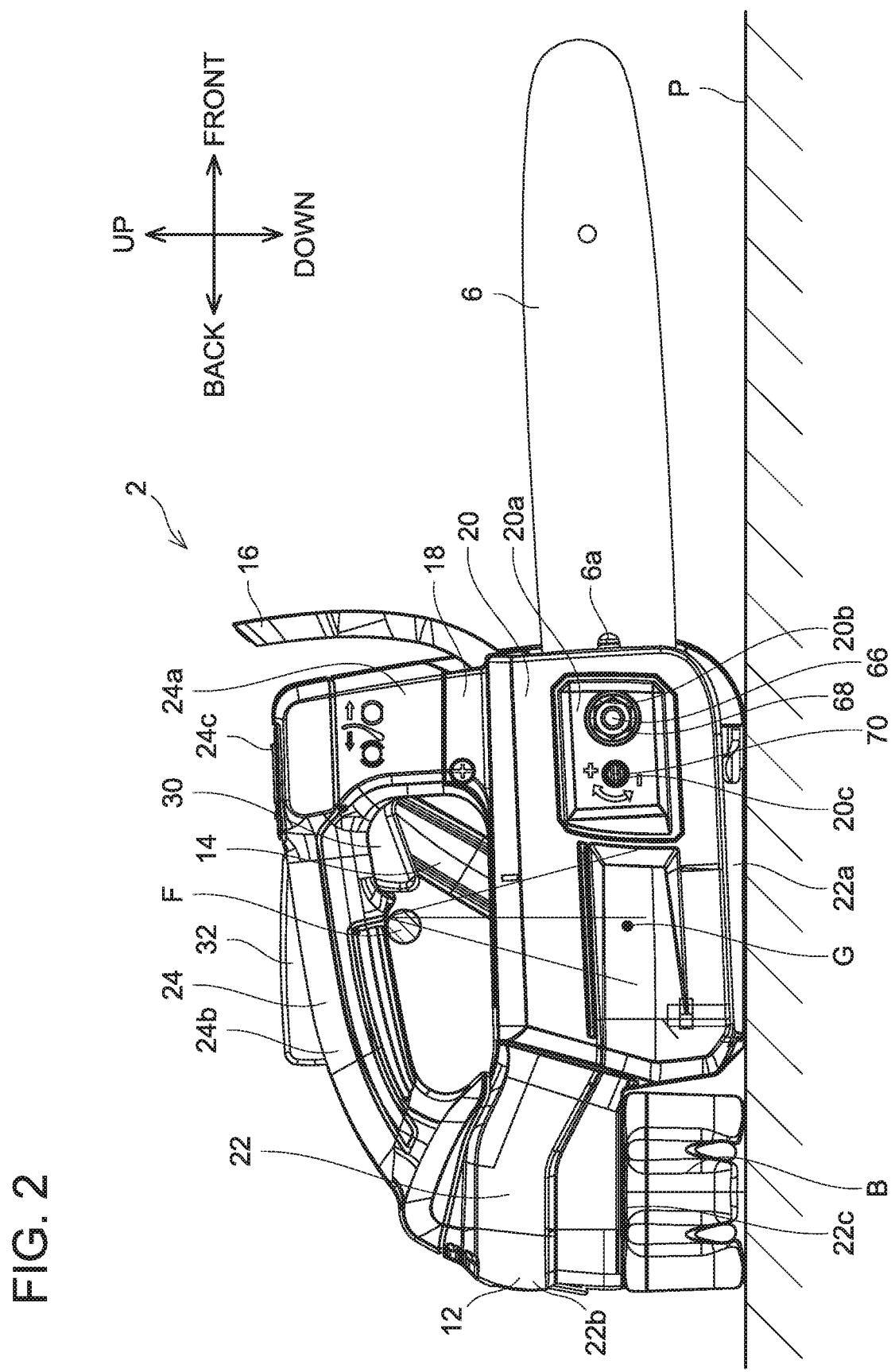
FIG. 2 is a right side view of the chain saw 2 of the embodiment.

As shown in FIGS. 1 and 2, the main body 4 includes a left-side housing 10, a right-side housing 12, a side handle 14, a hand guard 16, a brake cover 18, and a sprocket cover 20. The left-side housing 10 and the right-side housing 12 constitute a body housing 22 and a top handle 24. The left-side housing 10 defines an outer shape of a left half of each of the body housing 22 and the top handle 24, and the right-side housing 12 defines an outer shape of a right half of each of the body housing 22 and the top handle 24.

The body housing 22 includes a front-side body housing 22a that has a substantially rectangular solid-shape of which longitudinal direction is along the front-rear direction of the main body 4 and a rear-side body housing 22b that extends rearward from an upper-rear portion of the front-side body housing 22a. A battery mount 22c to which the battery B can be detachably attached by being slid in the left-right direction is provided on a lower surface of the rear-side body housing 22b. As shown in FIG. 2, when the chain saw 2 is placed on the mount surface P in a state where the battery B is attached to the chain saw 2, a lower surface of the front-side body housing 22a contacts the mount surface P and a lower surface of the battery B also contacts the mount surface P.

As shown in FIG. 1, the top handle 24 includes a support 24a that has a substantially columnar shape and protrudes upward from a front upper surface of the front-side body housing 22a and a grip 24b that has a substantially circular cross-section, and extends rearward from a rear upper side of the support 24a, curves downward, and then connects to an upper surface of the rear-side body housing 22b. A recess 24c is provided in an upper surface of the support 24a. A power switch 26 with which a user can perform an operation of switching power of the chain saw 2 between on and off, and a power lamp 28 configured to indicate an on-state and an off-state of the chain saw 2 are disposed in the recess 24c. A trigger switch 30 for the user to operate rotary driving of the saw chain 8 is disposed on a front lower surface of the grip 24b. A trigger lock lever 32 configured to switch between a state allowing the user to operate the trigger switch 30 and a state prohibiting the user from doing so is disposed on an upper portion of the grip 24b.

The side handle 14 has a substantially U-shaped outer shape that connects an upper-rear left side surface of the support 24a of the top handle 24 and a lower-rear left side surface of the front-side body housing 22a. A cross-sectional shape of the side handle 14 is substantially circular. When using the chain saw 2, the user grips the top handle 24 with his/her right hand and grips the side handle 14 by his/her left hand to hold the chain saw 2. From this state, when the user pushes down the trigger lock lever 32 of the top handle 24 with the palm of the right hand, the operation of the trigger switch 30 becomes allowed, and then the saw chain 8 is rotatingly driven by the user lifting the trigger switch 30 by the index finger of the right hand. On the upper surface of the rear-side body housing 22b, that is, at a portion of the body housing 22 to which the grip 24b of the top handle 24 is connected, a hand rest 22d on which the user can rest the hand is provided.

Figure 3:
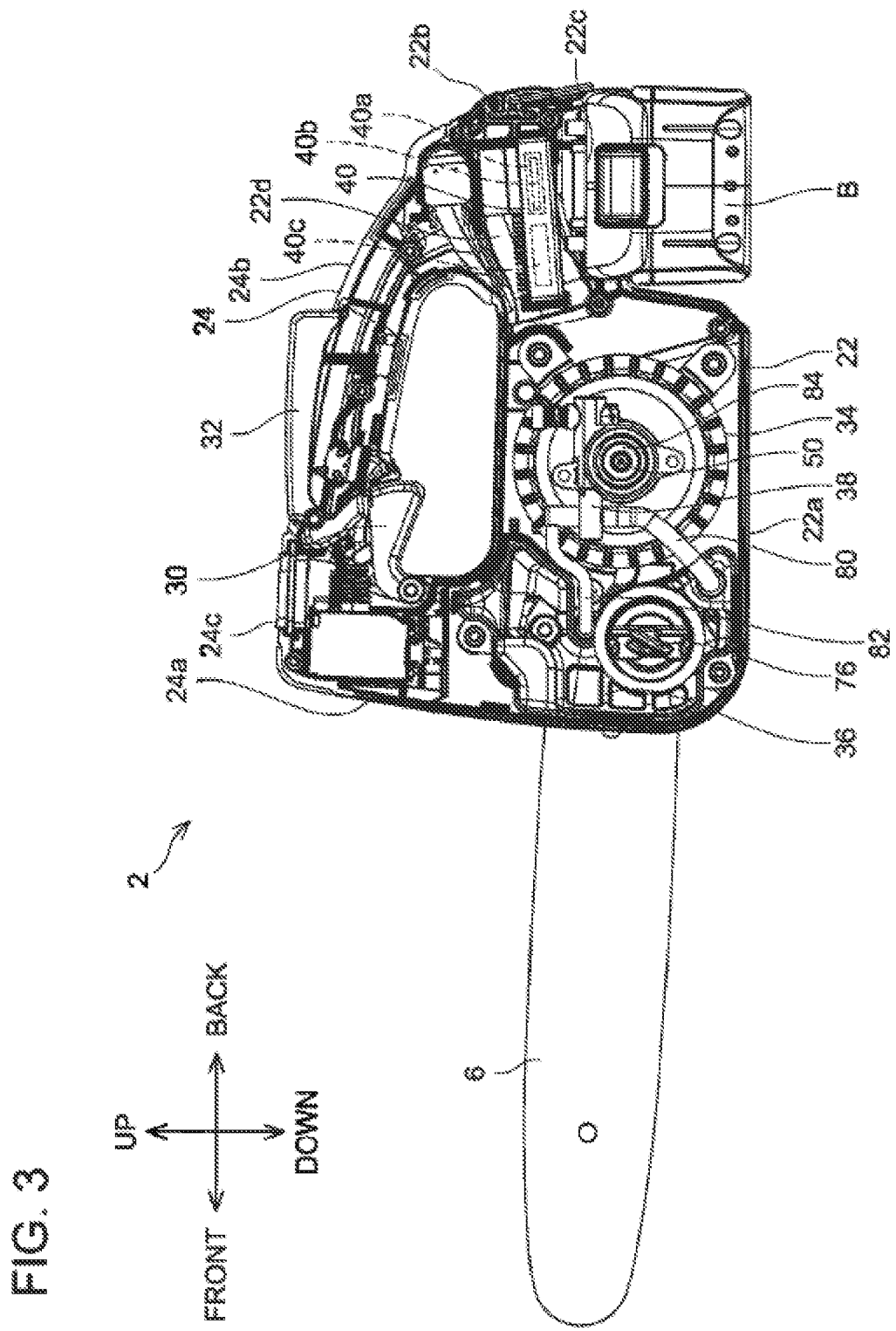
FIG. 3 is a left side view of the chain saw 2 of the embodiment in a state where a side handle 14 and a left-side housing 10 are detached.

As shown in FIG. 3, a motor 34, an oil tank 36, and an oil pump 38 are disposed inside the front-side body housing 22a. Further, a control unit 40 is disposed inside the rear-side body housing 22b. The oil tank 36 is disposed on a front side relative to the motor 34 and the oil pump 38.

Figure 4:
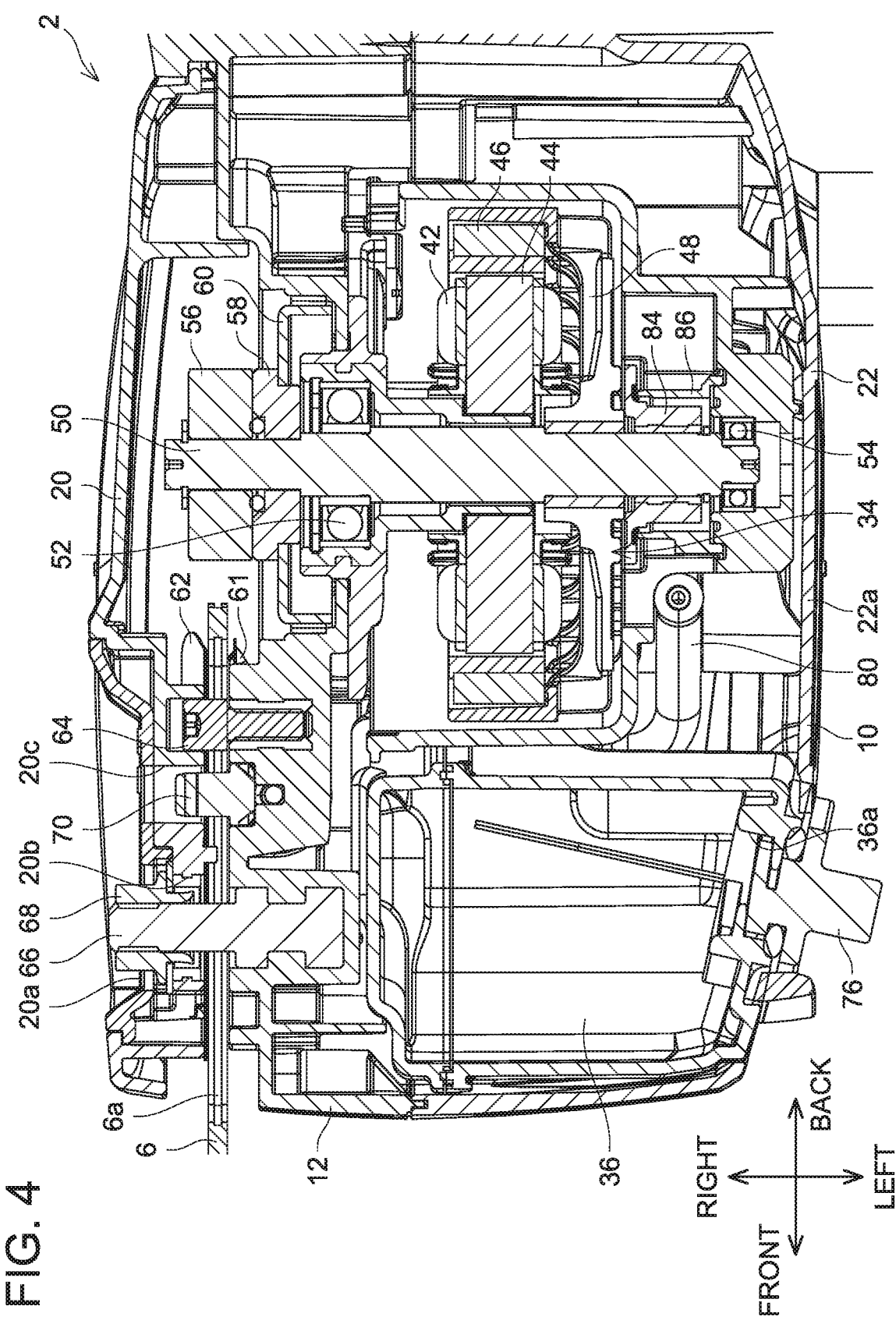
FIG. 4 is a horizontal cross-sectional view of the chain saw 2 of the embodiment in a vicinity of a motor 34.

As shown in FIG. 4, the motor 34 is an outer rotor type DC brushless motor. The motor 34 includes a stator 44 onto which a coil 42 is wound, a rotor 46 disposed outside the stator 44, a cooling fan 48 fitted with the rotor 46, and an output shaft 50 disposed to penetrate centers of the stator 44 and the rotor 46 and fitted with the cooling fan 48. The stator 44 is fixed to the body housing 22. The coil 42 of the stator 44 is connected to the control unit 40 (see FIG. 3). The control unit 40 includes an inverter circuit 40a provided with switching elements 40b and a control circuit 40c configured to control operations of the respective switching elements 40b, and is configured to control an operation of the motor 34 by controlling a voltage to be applied to the coil 42. The output shaft 50 is disposed along the left-right direction of the chain saw 2, and is supported rotatably on the body housing 22 via bearings 52, 54. The bearing 52 is disposed on a right side relative to the stator 44, and the bearing 54 is disposed on a left side relative to the stator 44 and the cooling fan 48. A sprocket 56 and a brake base 58 are fixed in a vicinity of a right end of the output shaft 50. The sprocket 56 and the brake base 58 are disposed on the right side relative to the bearing 52. A brake drum 60 is fitted with the brake base 58.

Figure 5:
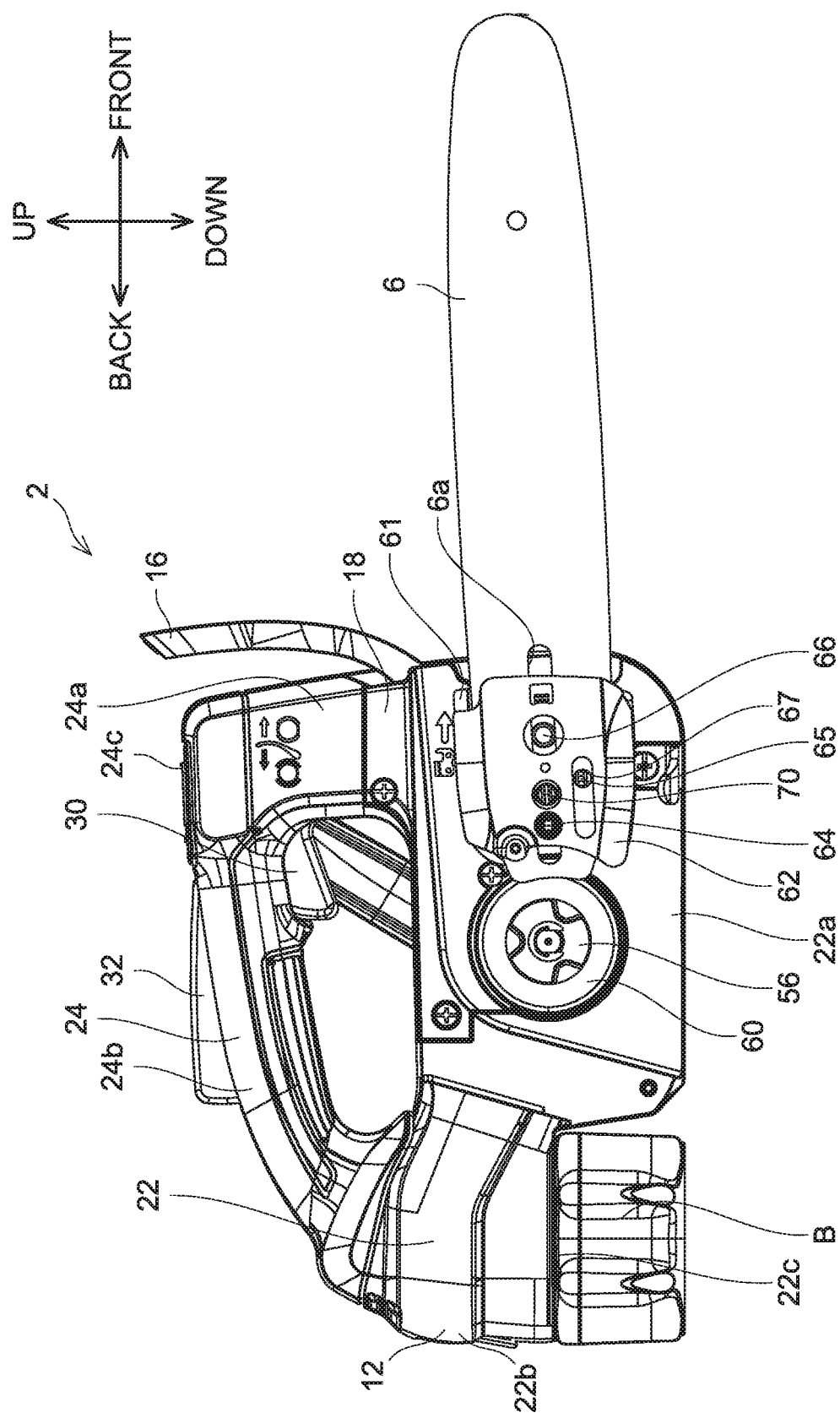
FIG. 5 is the right side view of the chain saw 2 of the embodiment in a state where a sprocket cover 20 is detached.

As shown in FIG. 5, the sprocket 56 is exposed to outside of the right-side housing 12. The saw chain 8 (see FIG. 1) is strapped onto the sprocket 56 from the guide bar 6. When the motor 34 is driven, the sprocket 56 rotates together with the output shaft 50, by which the saw chain 8 rotates about the sprocket 56 and the guide bar 6.

The guide bar 6 is fixed to the right-side housing 12 in a state of being interposed between an inner guide plate 61 and an outer guide plate 62. The inner guide plate 61 has a shape in which vicinities of upper and lower ends thereof are curved inward (toward the left side of the chain saw 2). The outer guide plate 62 has a shape in which vicinities of upper and lower ends thereof are curved outward (toward the right side of the chain saw 2). The guide bar 6 is provided with a long hole 6a along the longitudinal direction of the guide bar 6. The guide bar 6 is supported on the body housing 22 via a support pin 64 and a support bolt 66 penetrating through the long hole 6a. As shown in FIG. 2, a nut 68 is attached to and fastened on the support bolt 66 from outer side of the sprocket cover 20 and the outer guide plate 62. The user can change a distance between the guide bar 6 and the sprocket 56 by sliding the guide bar 6 along the long hole 6a in a state where the nut 68 is loosened to adjust a degree of tension of the saw chain 8.

Figure 6:
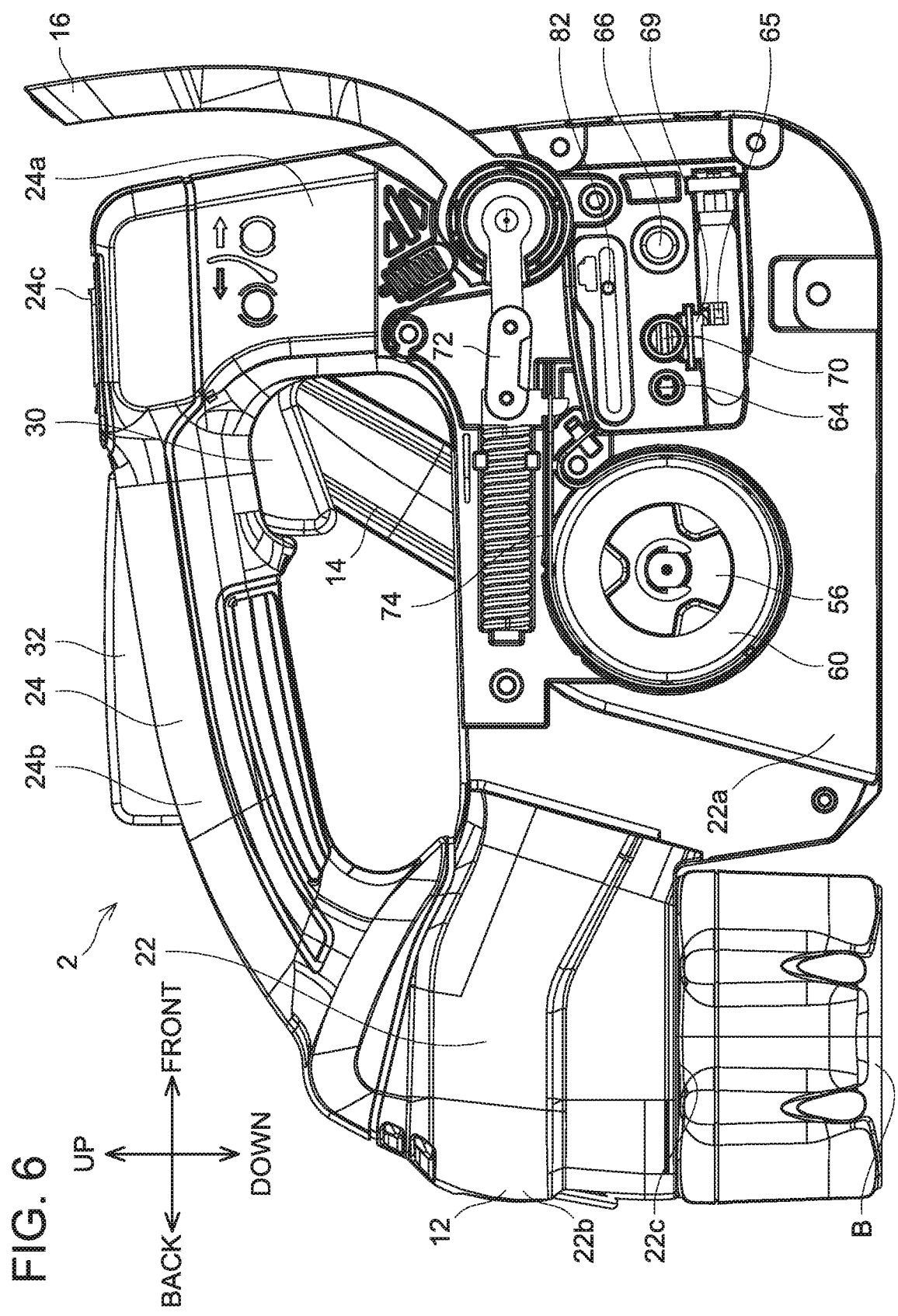
FIG. 6 is the right side view of the chain saw 2 of the embodiment in a state where the sprocket cover 20, a guide bar 6, and a brake cover 18 are detached.

As shown in FIG. 5, the guide bar 6 is provided with an engaging hole 67 configured to engage with an engaging hook 65. As shown in FIG. 6, the engaging hook 65 is connected to an adjusting screw 70 via a rotation-linear motion converting mechanism 69. The rotation-linear motion converting mechanism 69 is configured to convert rotary motion of the adjusting screw 70 to linear motion of the engaging hook 65 in a direction along the long hole 6a. As shown in FIG. 5, the adjusting screw 70 penetrates the long hole 6a without contacting an inner peripheral surface of the long hole 6a. When the user turns the adjusting screw 70, the engaging hook 65 moves in the direction along the long hole 6a of the guide bar 6, and the guide bar 6 slides in the direction along the long hole 6a.

As shown in FIG. 5, the sprocket 56, the inner guide plate 61, the outer guide plate 62, and the support pin 64 are covered by the sprocket cover 20. The sprocket cover 20 includes a recess 20a. As shown in FIG. 4, the recess 20a is provided with a fastening opening 20b through which the support bolt 66 penetrates and an adjustment opening 20c through which the adjusting screw 70 can be accessed from outside. The nut 68 is fastened onto the support bolt 66 from the outside of the recess 20a. The user can tighten or loosen the nut 68 in a state where the sprocket cover 20 is attached. Further, the user can adjust the degree of tension of the saw chain 8 by turning the adjusting screw 70 through the adjustment opening 20c in the state where the sprocket cover 20 is attached.

As shown in FIG. 6, the hand guard 16 is connected to a brake shoe 74 via a link mechanism 72. The hand guard 16 is configured to be capable of swinging about a swing axis along the left-right direction of the chain saw 2. The brake shoe 74 is disposed to surround a periphery of the brake drum 60. The link mechanism 72 is configured to cause the brake shoe 74 to shrink its diameter when the hand guard 16 is tilted forward and to cause the brake shoe 74 to expand the diameter when the hand guard 16 is lifted up rearward. When the brake shoe 74 shrinks its diameter, an inner peripheral surface of the brake shoe 74 abuts an outer peripheral surface of the brake drum 60, and frictional force therebetween suppresses rotation of the output shaft 50.

The oil tank 36 shown in FIG. 3 reserves lubricant for lubricating the saw chain 8. The oil tank 36 includes a cap 76 detachably attached to a replenishing opening 36a (see FIG. 4) for replenishing the oil tank 36 with the lubricant. As shown in FIG. 1, the cap 76 of the oil tank 36 is exposed to outside the left-side housing 10 and is disposed on a front-lower left surface of the front-side body housing 22a. A fluid level checking opening 78 through which a fluid level in the oil tank 36 can be visually checked is provided on a front side relative to the cap 76 of the left-side housing 10.

The oil pump 38 shown in FIG. 3 suctions the lubricant in the oil tank 36 through an introduction pipe 80 and sends out the lubricant toward the guide bar 6 through a delivery pipe 82 in conjunction with rotation of the motor 34. A worm gear 84 configured to drive the oil pump 38 is fitted in a vicinity of a left end of the output shaft 50 of the motor 34. As shown in FIG. 4, the worm gear 84 is disposed on the left side relative to the stator 44 and the cooling fan 48 and on the right side relative to the bearing 54.

Figure 7:
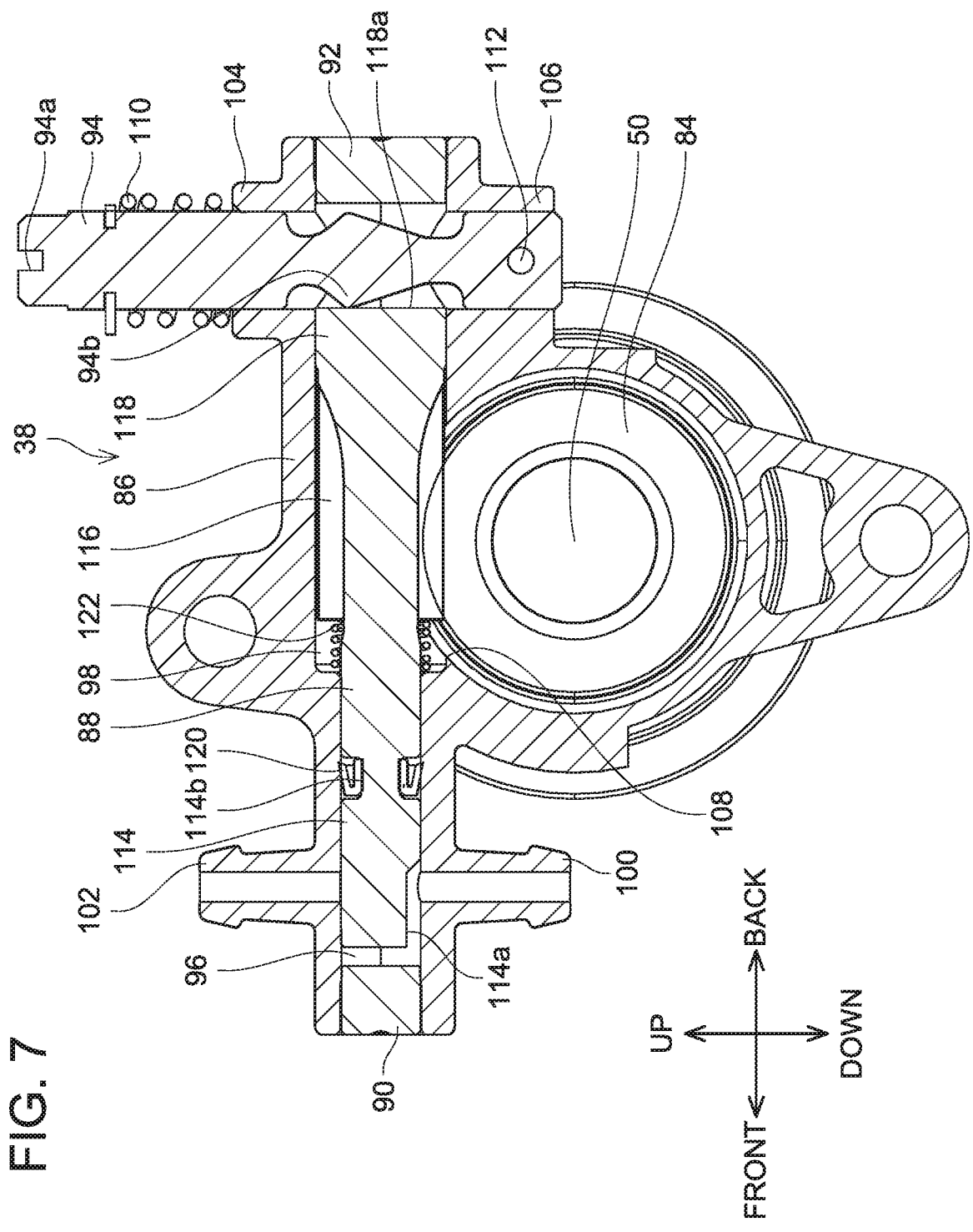
FIG. 7 is a vertical cross-sectional view of an oil pump 38 of the chain saw 2 of the embodiment.

As shown in FIG. 7, the oil pump 38 includes a bracket 86, a plunger 88, a front-side cap 90, a rear-side cap 92, and an adjustment pin 94. A substantially cylindrical front-side inner space 96 and a substantially cylindrical rear-side inner space 98 that is coaxial with the front-side inner space 96 and has a larger diameter than the front-side inner space 96 are provided inside the bracket 86. A front side of the front-side inner space 96 is closed by the front-side cap 90. An introduction port 100 communicated with the introduction pipe 80 is provided below the front-side inner space 96. A delivery port 102 communicated with the delivery pipe 82 is provided above the front-side inner space 96. A rear side of the rear-side inner space 98 is closed by the rear-side cap 92. An upper port 104 communicated with outside is provided at a rear upper portion of the rear-side inner space 98, and a lower port 106 communicated with outside is provided at a rear lower portion of the rear-side inner space 98. Further, an opening 108 is provided at a front lower portion of the rear-side inner space 98.

Figure 8:
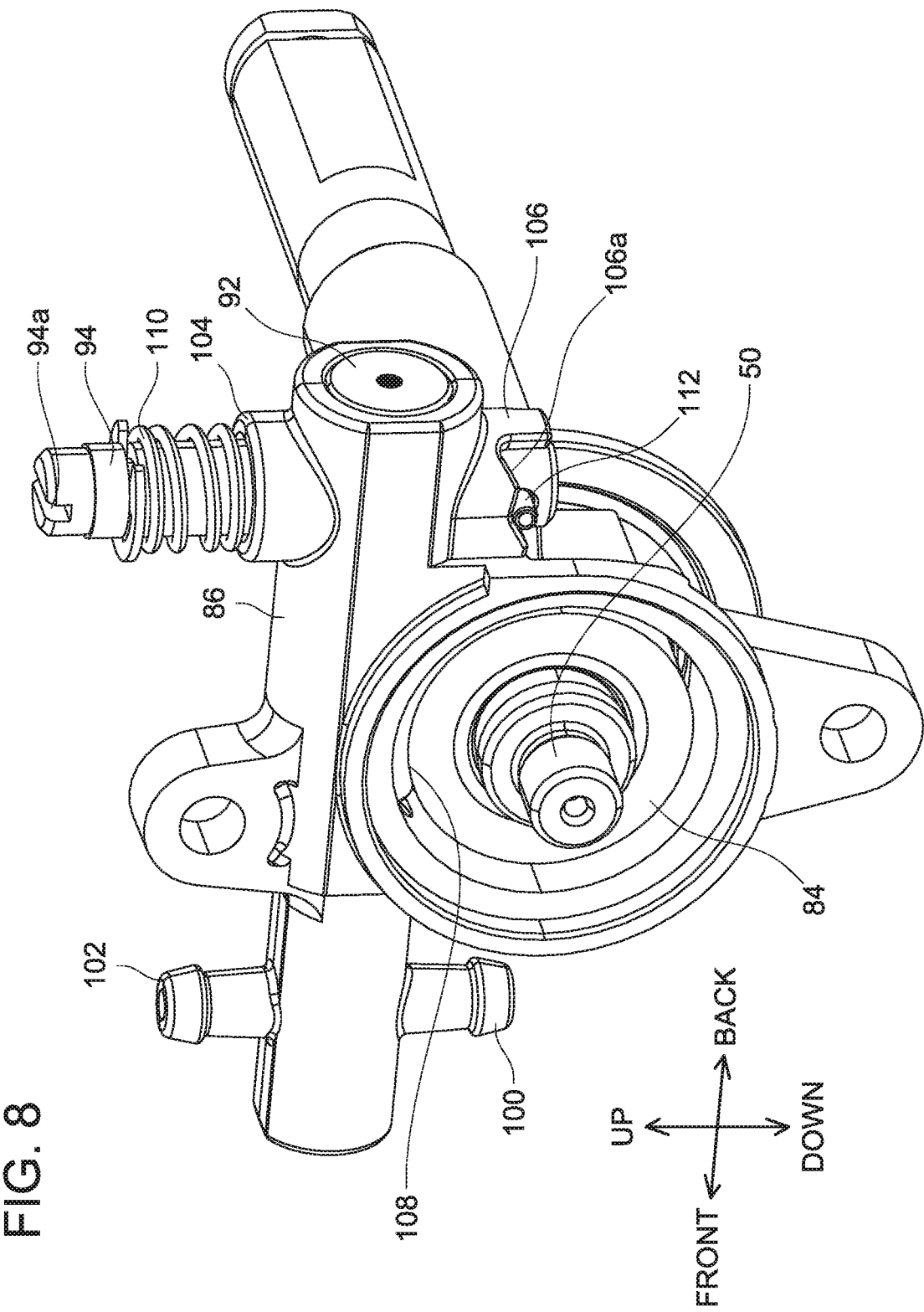
FIG. 8 is a perspective view of the oil pump 38 of the chain saw 2 of the embodiment.

The adjustment pin 94 is disposed to penetrate through the upper port 104, the rear-side inner space 98, and the lower port 106. As shown in FIG. 8, a tool groove 94a is provided in an upper end surface of the adjustment pin 94. The adjustment pin 94 is biased upward by a coil spring 110 disposed above the upper port 104. A positioning pin 112 is inserted through the adjustment pin 94 at a portion lower than the lower port 106. The positioning pin 112 abuts a pedestal surface 106a provided around the lower port 106. The pedestal surface 106a is configured such that a position at which it abuts the positioning pin 112 in the up-down direction changes according to a rotation angle of the adjustment pin 94. As shown in FIG. 7, the adjustment pin 94 is provided with a protrusion 94b. The protrusion 94b is disposed within the rear-side inner space 98. The protrusion 94b has a rotationally symmetric shape with respect to an axis line of the adjustment pin 94.

Figure 9:
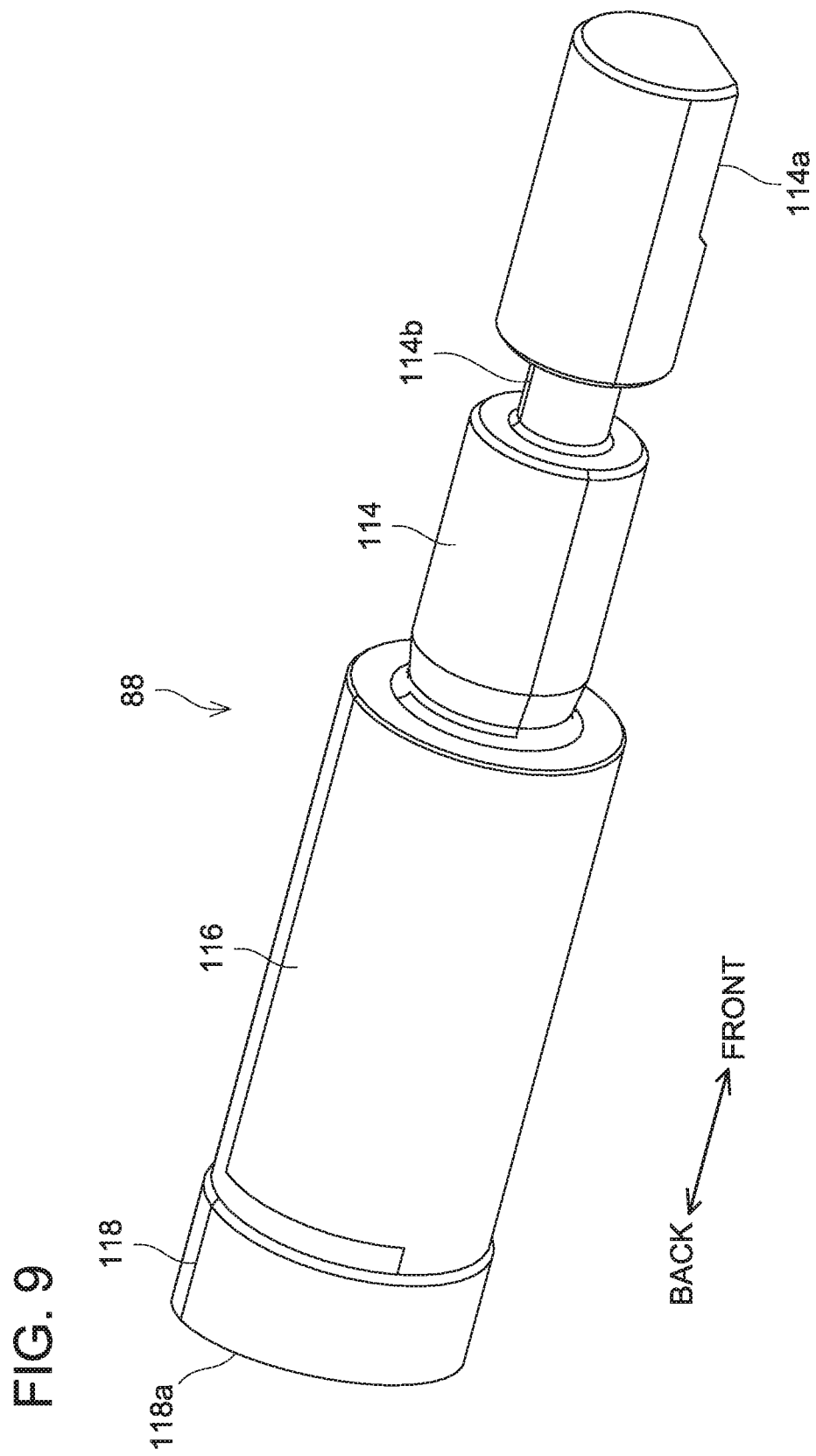
FIG. 9 is a perspective view of a plunger 88 of the chain saw 2 of the embodiment.

As shown in FIGS. 7 and 9, the plunger 88 includes a substantially cylindrical small diameter portion 114 corresponding to the front-side inner space 96, a thread portion 116 having an outer surface with a thread, and a substantially cylindrical large diameter portion 118 corresponding to the rear-side inner space 98. The small diameter portion 114 is provided with a notch 114a for communicating the introduction port 100 or the delivery port 102 to the front-side inner space 96, and a seal accommodating portion 114b that accommodates a seal 120 for sealing the front-side inner space 96 from the rear-side inner space 98. The thread of the thread portion 116 has a shape that meshes with the worm gear 84. A rear end surface 118a of the large diameter portion 118 configures a flat surface tilted relative to an axis line of the plunger 88.

As shown in FIG. 7, the plunger 88 has the small diameter portion 114 disposed over the front-side inner space 96 and the rear-side inner space 98, and has the thread portion 116 and the large diameter portion 118 disposed in the rear-side inner space 98. The thread portion 116 of the plunger 88 meshes with the worm gear 84 through the opening 108. Further, the thread portion 116 of the plunger 88 is biased rearward by a coil spring 122 in the rear-side inner space 98. The rear end surface 118a of the large diameter portion 118 of the plunger 88 abuts the protrusion 94b of the adjustment pin 94.

An operation of the oil pump 38 will be described. When the output shaft 50 of the motor 34 rotates, the thread portion 116 rotates accompanying rotation of the worm gear 84, by which the plunger 88 rotates about its axis line. Since the rear end surface 118a of the large diameter portion 118 of the plunger 88 has the flat surface tilted relative to the axis line of the plunger 88, a position at which the rear end surface 118a of the large diameter portion 118 of the plunger 88 abuts the protrusion 94b of the adjustment pin 94 changes with the rotation of the plunger 88, by which the plunger 88 advances or retreats in the front-rear direction. In the oil pump 38, the notch 114a faces the introduction port 100 at a timing when the plunger 88 retreats and suctions the lubricant from the introduction port 100 to the front-side inner space 96, and the notch 114a faces the delivery port 102 at a timing when the plunger 88 advances and discharges the lubricant from the front-side inner space 96 to the delivery port 102.

In the oil pump 38, when the user inserts a tool in the tool groove 94a and rotates the adjustment pin 94, a position at which the positioning pin 112 abuts the pedestal surface 106a changes, by which a position of the adjustment pin 94 in the up-down direction changes. When the position of the adjustment pin 94 in the up-down direction changes, a position of the protrusion 94b changes in the rear-side inner space 98, by which a moving amount of the plunger 88 when it advances or retreats in the front-rear direction changes. For example, when the protrusion 94b is at a position close to the axis line of the plunger 88 in the up-down direction, the moving amount of the plunger 88 when it advances or retreats in the front-rear direction becomes small. To the contrary, when the protrusion 94b is at a position far from the axis line of the plunger 88 in the up-down direction, the moving amount of the plunger 88 when it advances or retreats in the front-rear direction becomes large. When the moving amount of the plunger 88 when it advances or retreats in the front-rear direction changes, a discharge amount of the lubricant supplied from the oil tank 36 to the guide bar 6 changes. That is, the user can adjust the discharge amount of the lubricant supplied from the oil tank 36 to the guide bar 6 by rotating the adjustment pin 94.

Figure 10:
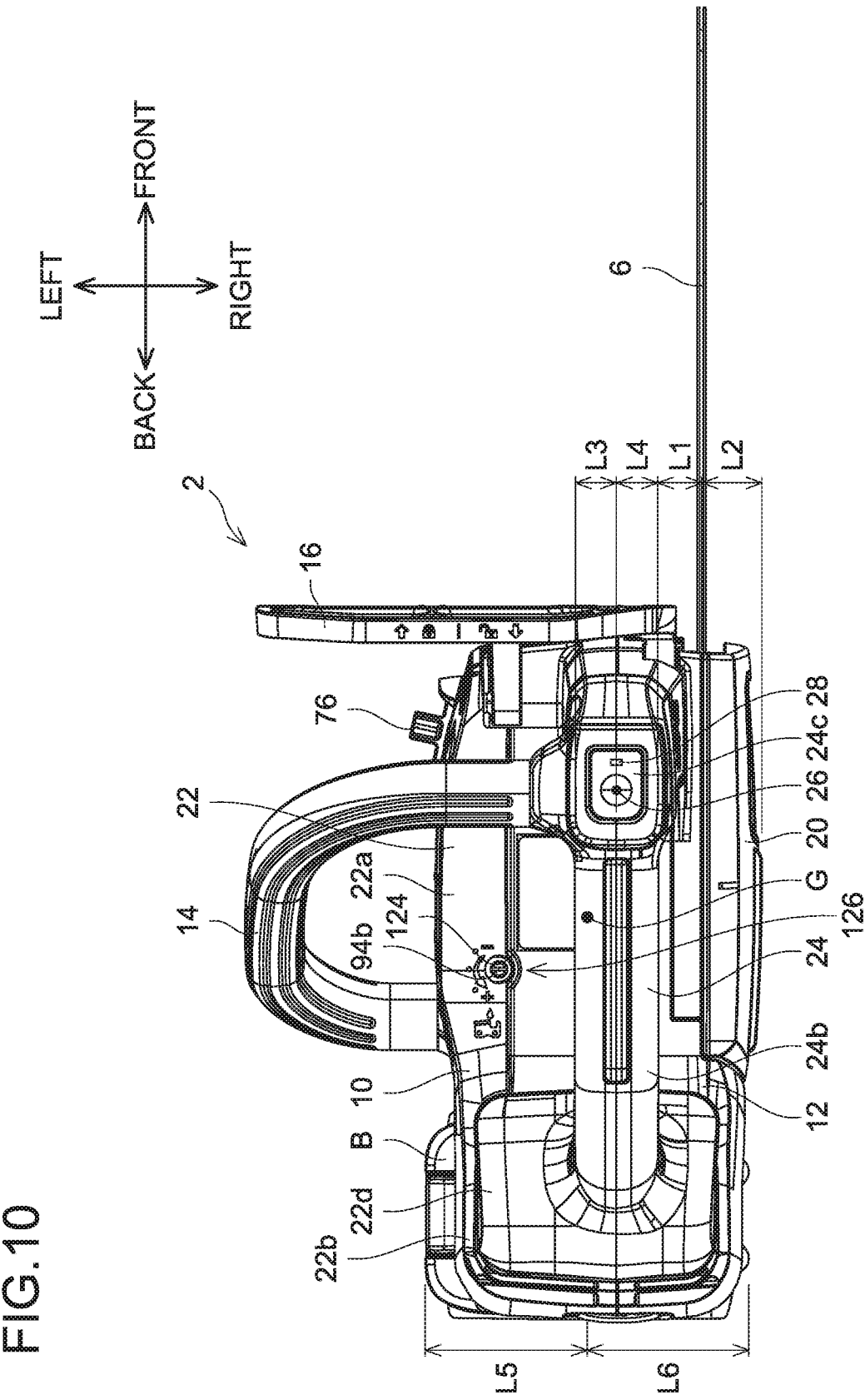
FIG. 10 is a top view of the chain saw 2 of the embodiment.

As shown in FIG. 10, an adjustment opening 124 through which the user can insert the tool in the tool groove 94a of the adjustment pin 94 is provided at an upper surface of the body housing 22. In the left-right direction of the chain saw 2, the adjustment opening 124 is disposed on the left side relative to the top handle 24. In the front-rear direction of the chain saw 2, the adjustment opening 124 is disposed between a portion of the side handle 14 that is connected to the top handle 24 and a portion of the side handle 14 that is connected to the body housing 22. By providing the adjustment opening 124 at such a position, the user can easily insert the tool in the tool groove 94a of the adjustment pin 94 and can easily adjust the discharge amount of the lubricant. In the chain saw 2 of the present embodiment, a discharge amount adjusting mechanism 126 is constituted of the adjustment pin 94 and the adjustment opening 124.

The adjustment opening 124 may be provided at a position other than the aforementioned position. For example, the adjustment opening 124 may be provided in a left side surface of the body housing 22. Alternatively, the adjustment opening 124 may be provided in a right side surface of the body housing 22, a front surface of the body housing 22, or a rear surface of the body housing 22. In a case where the adjustment opening 124 is provided in the upper surface, the left side surface, or the rear surface of the body housing 22, dust which scatters in cutting work by the chain saw 2 can be suppressed from entering the adjustment opening 124.

In the chain saw 2 of the present embodiment, the oil pump 38 is disposed on the left side relative to the motor 34. Due to this, the number of components housed in a space on the right side relative to the motor 34 inside the body housing 22 can be reduced as compared to a case where the oil pump 38 is disposed on the right side relative to the motor 34.

Further, in the chain saw 2 of the present embodiment, the sprocket 56 is connected directly to the output shaft 50 of the motor 34 without interventions of mechanisms such as gears and clutches. Due to this, the sprocket 56 can be disposed closer to a center of the body housing 22 as compared to a case where the sprocket 56 is connected to the output shaft 50 of the motor 34 with the interventions of mechanisms such as gears and clutches.

As shown in FIG. 10, in the chain saw 2 of the present embodiment, a relationship L1/(L1+L2)≤0.3 is established, where in a plan view of the chain saw 2 from above, a distance from a right end surface of the top handle 24 to a center line of the guide bar 6 is L1 and a distance from the center line of the guide bar 6 to a right end surface of the sprocket cover 20 is L2. According to this configuration, since the top handle 24 and the guide bar 6 are disposed relatively close to each other in the left-right direction of the chain saw 2, the user can easily acknowledge intuitively a cutting position by the saw chain 8 when holding the top handle 24 by the right hand. Further, according to this configuration, a center of gravity of the guide bar 6 is located at a position close to the top handle 24 in the left-right direction of the chain saw 2, and thus is located at a position close to a center of gravity G of the chain saw 2. Due to this, even in a case where a different type of the guide bar 6 is attached, a position of the center of gravity G of the chain saw 2 can be suppressed from changing in the left-right direction of the chain saw 2. In the chain saw 2 of the present embodiment, a distance L1+L2 from the right end surface of the top handle 24 to the right end surface of the sprocket cover 20 is ensured by 30 mm or more.

In the chain saw 2 of the present embodiment, in the top view of the chain saw 2 in a state where the chain saw 2 is placed on the mount surface, the center of gravity G of the chain saw 2 is disposed within a range of twice a distance L3 from a center line of the top handle 24 in the left-right direction to a left end surface of the top handle 24 (preferably, a range of 1.5 times the distance L3 (more preferably, a range of 1.2 times the distance L3)) and a range of twice a distance L4 from the center line of the top handle 24 in the left-right direction to the right end surface of the top handle 24 (preferably, a range of 1.5 times the distance L4 (more preferably, a range of 1.2 times the distance L4)). By such a configuration, the chain saw 2 is less likely to tilt leftward or rightward when the user grips the top handle 24 with the right hand to hold the chain saw 2. Workability of the cutting work using the chain saw 2 can be improved.

In the chain saw 2 of the present embodiment, in the top view of the chain saw 2 in the state where the chain saw 2 is placed on the mount surface, the body housing 22, the top handle 24, and the guide bar 6 are disposed in a range of 1.2 times a distance L5 from a center line of the battery B in the left-right direction to a left end surface of the battery B (preferably, a range of 1.1 times the distance L5 (more preferably, a range of 1.0 times the distance L5)) and a range of 1.2 times a distance L6 from the center line of the battery B in the left-right direction to a right end surface of the battery B (preferably, a range of 1.1 times the distance L6 (more preferably, a range of 1.0 times the distance L6)). The motor 34, the oil tank 36, the oil pump 38, and the control unit 40 housed in the body housing 22 are also disposed within the above ranges. By such a configuration, a size of the body housing 22 in the left-right direction can be made small.

As shown in FIG. 2, in the chain saw 2 of the present embodiment, when the chain saw 2 is mounted on the mount surface P, the position of the center of gravity G of the chain saw 2 in the front-rear direction and the up-down direction is located within a range of plus and minus 15° relative to a line extending perpendicularly downward from an uppermost portion of the lower surface of the top handle 24 located on the rear side relative to the trigger switch 30 (preferably, within a range of plus and minus 10° thereof (more preferably, within a range of plus and minus 5° thereof)). Upon when the user grips the top handle 24 with the right hand to hold the chain saw 2, the user operates the trigger switch 30 with the index finger, so a middle finger F is placed on the uppermost portion of the lower surface of the top handle 24 located on the rear side relative to the trigger switch 30 to hold the chain saw 2. In the chain saw 2 of the present embodiment, since the center of gravity G of the chain saw 2 is located in the above-mentioned range in the front-rear direction and the up-down direction, a balance of the chain saw 2 in the front-rear direction can be maintained even in a case where the middle finger F is placed on the uppermost portion of the lower surface of the top handle 24 located on the rear side relative to the trigger switch 30 to hold the chain saw 2.

As above, the chain saw 2 of the embodiment includes the motor 34 configured to rotate the saw chain 8 about the guide bar 6, the control unit 40 configured to control the voltage applied to the motor 34, the body housing 22 that houses the motor 34 and the control unit 40, the battery B detachably attached to the body housing 22, and the top handle 24 provided above the body housing 22. As shown in FIG. 3, the control unit 40 is disposed above the battery B. In the rear view of the chain saw 2 in the state where the chain saw 2 is placed on the mount surface, the battery B and the control unit 40 do not overlap. In the top view of the chain saw 2 in the state where the chain saw 2 is placed on the mount surface, the battery B and the control unit 40 overlap at least partially. According to the above configuration, the size of the body housing 22 in the front-rear direction can be made small as compared to a case where the control unit 40 and the battery B are disposed to be offset from each other in the front-rear direction such that they do not overlap.

In the chain saw 2 according to the embodiment, the hand rest 22d is provided in the vicinity of the portion of the body housing 22 where the rear end of the top handle 24 connects to the body housing 22. The control unit 40 is disposed inside the hand rest 22d. According to the above configuration, convenience for the user can be improved by providing the hand rest 22d in the vicinity of the portion of the body housing 22 where the rear end of the top handle 24 connects to the body housing 22. Further, according to the above configuration, the internal space in the hand rest 22d can be efficiently used by disposing the control unit 40 in the internal space of the hand rest 22d of the body housing 22, and the size of the body housing 22 can further be made smaller.

In the chain saw 2 according to the embodiment, in the rear view of the chain saw 2 in the state where the chain saw 2 is placed on the mount surface, the top handle 24 and the battery B do not overlap. In the top view of the chain saw 2 in the state where the chain saw 2 is placed on the mount surface, the top handle 24 and the battery B overlap at least partially. According to the above configuration, the control unit 40 is disposed in the space between the top handle 24 and the battery B inside the body housing 22. According to the above configuration, the size of the body housing 22 in the front-rear direction can be made small as compared to the case where the top handle 24 and the battery B are disposed to be offset from each other in the front-rear direction so that they do not overlap.

In the chain saw 2 according to the embodiment, the battery B is detachable by being slid in the left-right direction relative to the body housing 22. According to the above configuration, the size of the body housing 22 in the front-rear direction can be further made small as compared to the case where the battery B is detachable by being slid in the front-rear direction relative to the body housing 22.

The chain saw 2 according to the embodiment includes the motor 34 configured to rotate the saw chain 8 about the guide bar 6, the control unit 40 configured to control the voltage applied to the motor 34, the body housing 22 that houses the motor 34 and the control unit 40, the battery B detachably attached to the body housing 22, and the top handle 24 provided above the body housing 22. As shown in FIG. 3, in the top view of the chain saw 2 in the state where the chain saw 2 is placed on the mount surface, the motor 34 and the battery B do not overlap, and the motor 34 and the control unit 40 do not overlap. As shown in FIGS. 3 and 10, in the rear view of the chain saw 2 in the state where the chain saw 2 is placed on the mount surface, the motor 34 and the battery B overlap at least partially, and the motor 34 and the control unit 40 overlap at least partially. In the chain saw 2 provided with the motor 34, the output shaft 50 of the motor 34 is disposed along the left-right direction of the chain saw 2 in many cases. In such cases, if the battery B and the control unit 40 are disposed above or below the motor 34 inside the body housing 22, the size of the body housing 22 in the up-down direction becomes large. According to the above configuration, since the battery B and the control unit 40 are not disposed above or below the motor 34 inside the body housing 22, the size of the body housing 22 in the up-down direction can be made smaller. Further, according to the above configuration, in the rear view of the chain saw 2, the motor 34 and the battery B overlap at least partially and the motor 34 and the control unit 40 overlap at least partially, so the size of the body housing 22 in the left-right direction can also be made smaller.

In the chain saw 2 according to the embodiment, the battery B and the control unit 40 are disposed on the rear side relative to the motor 34. According to the above configuration, the battery B can be attached and detached on the rear side of the body housing 22, which is a position separated away from the guide bar 6, and work performed by the user to attach and detach the battery B becomes easier. Further, according to the above configuration, since both the battery B and the control unit 40 are disposed on the rear side relative to the motor 34, the size of the body housing 22 in the front-rear direction can further be made smaller.

In the chain saw 2 according to the embodiment, as shown in FIG. 10, in the top view of the chain saw 2 in the state where the chain saw 2 is placed on the mount surface, the motor 34 is disposed within the range of 1.2 times the width of the battery B in the left-right direction from the center line of the battery B in the left-right direction. According to the above configuration, in the left-right direction of the chain saw 2, the size of the body housing 22 in the left-right direction can be further made small as compared to the case where the battery B and the motor 34 are disposed to be offset greatly from each other.

As shown in FIG. 3, the chain saw 2 according to the embodiment includes the motor 34 configured to rotate the saw chain 8 about the guide bar 6, the oil pump 38 configured to supply the lubricant to the saw chain 8 in conjunction with the rotation of the motor 34, and the body housing 22 that houses the motor 34 and the oil pump 38. As shown in FIG. 8, the chain saw 2 is provided with the discharge amount adjusting mechanism 126 including the adjustment pin 94 (which is an example of the adjusting member) configured to adjust the discharge amount of the lubricant in the oil pump 38. The discharge amount adjusting mechanism 126 is disposed at the surface of the body housing 22 that is exposed to outside in the state where the chain saw 2 is placed on the mount surface. According to the above configuration, since the discharge amount adjusting mechanism 126 is disposed on the surface of the body housing 22 that is exposed to outside in the state where the chain saw 2 is placed on the mount surface, the user can operate the adjustment pin 94 in the state where the chain saw 2 is placed on the mount surface when adjusting the discharge amount of the lubricant. The work of adjusting the discharge amount of the lubricant can easily be performed.

In the chain saw 2 according to the embodiment, the top handle 24 provided above the body housing 22 is further provided. The discharge amount adjusting mechanism 126 is disposed on the left side relative to the top handle 24. According to the above configuration, when adjusting the discharge amount of the lubricant, the user can operate the adjustment pin 94 with his/her left hand even while gripping on the top handle 24 with his/her right hand to hold the chain saw 2. The work of adjusting the discharge amount of the lubricant can easily be performed.

In the chain saw 2 according to the embodiment, the oil pump 38 is disposed on the left side relative to the motor 34. If the oil pump 38 is disposed on the right side relative to the motor 34 and the discharge amount adjusting mechanism 126 is disposed on the left side relative to the top handle 24, the discharge amount adjusting mechanism 126 needs to be configured with a complex structure. According to the above configuration, since the oil pump 38 is disposed on the left side relative to the motor 34 and the discharge amount adjusting mechanism 126 is disposed on the left side relative to the top handle 24, the discharge amount adjusting mechanism 126 can be configured with a simple structure.

The chain saw 2 according to the embodiment further includes the side handle 14 provided on the left side relative to the body housing 22. The discharge amount adjusting mechanism 126 is disposed on the rear side relative to the front end of the side handle 14. According to the above configuration, the side handle 14 will not interfere when the user operates the adjustment pin 94. The work of adjusting the discharge amount of the lubricant can more easily be performed.

In the chain saw 2 according to the embodiment, the discharge amount adjusting mechanism 126 is disposed at the upper surface of the body housing 22. According to the above configuration, the user can visually recognize the adjustment pin 94 without bending his/her body or lifting the chain saw 2 to a level of his/her eyes. Due to this, the user can more easily perform work of operating the adjustment pin 94.

In the chain saw 2 according to the embodiment, the adjustment pin 94 is disposed inside the body housing 22. The discharge amount adjusting mechanism 126 further includes the adjustment opening 124 provided at the body housing 22 and allowing the tool for operating the adjustment pin 94 to pass therethrough. According to the above configuration, since the adjustment pin 94 is disposed inside the body housing 22, the adjustment pin 94 can be prevented from being operated by mistake.

The chain saw 2 according to the embodiment includes the motor 34 (which is an example of prime mover) configured to rotate the saw chain 8 about the guide bar 6, the sprocket 56 configured to transmit the rotation of the motor 34 to the saw chain 8, the body housing 22 that houses the motor 34, the sprocket cover 20 covering the sprocket 56, and the top handle 24 provided above the body housing 22. As shown in FIG. 10, in the top view of the chain saw 2 in the state where the chain saw 2 is placed on the mount surface, a ratio of the distance L1 between the right end surface of the top handle 24 and the center line of the guide bar 6 to the distance L1+L2 between the right end surface of the top handle 24 and the right end surface of the sprocket cover 20 is 0.3 or less. According to the above configuration, since the top handle 24 and the guide bar 6 are disposed relatively close to each other in the left-right direction, the user can more easily acknowledge the cutting position by the saw chain 8 intuitively upon when the user grips the top handle 24. Further, according to the above configuration, in the left-right direction of the chain saw 2, the center of gravity of the guide bar 6 is located at the position close to the top handle 24, and thus is located at the position close to the center of gravity G of the chain saw 2. Due to this, even if a different type of the guide bar 6 is attached, the position of the center of gravity G of the chain saw 2 can be suppressed from changing in the left-right direction of the chain saw 2.

In the chain saw 2 according to the embodiment, in the top view of the chain saw 2 in the state where the chain saw 2 is placed on the mount surface, the center of gravity G of the chain saw 2 is disposed within the range of twice the width of the top handle 24 in the left-right direction from the center line of the top handle 24 in the left-right direction. According to the above configuration, when the user grips the top handle 24 with the right hand to hold the chain saw 2, the chain saw 2 is less likely to tilt leftward or rightward. The workability of the cutting work using the chain saw 2 can be improved.

In the chain saw 2 according to the embodiment, the prime mover configured to rotate the saw chain 8 about the guide bar 6 is the motor 34. Since the motor 34 has a simple structure as compared to other prime movers such as an engine, the position of the center of gravity can easily be identified in designing the chain saw 2, and its attachment position inside the body housing 22 can easily be adjusted. According to the above configuration, the center of gravity G of the chain saw 2 can be disposed in the vicinity of the top handle 24 in the left-right direction of the chain saw 2 by balancing a weight of the guide bar 6 and a weight of the motor 34.

The chain saw 2 according to the embodiment further includes the battery B detachably attached to the body housing 22. Different from a case where power is supplied with a power cord, in the case where power is supplied by the battery B, the battery B attached to the body housing 22 can be used as a weight for adjusting the position of the center of gravity of the chain saw 2. According to the above configuration, the center of gravity of the chain saw 2 can be disposed in the vicinity of the top handle 24 in the left-right direction of the chain saw 2 by balancing the weight of the guide bar 6, the weight of the motor 34, and a weight of the battery B.

The chain saw 2 according to the embodiment may be configured to allow the battery B to be detachably attached to the battery mount 22c of the body housing 22 by sliding the battery B in the front-rear direction.

In the chain saw 2 according to the embodiment, the battery mount 22c of the body housing 22 may be provided on the front surface, the rear surface, the left side surface, the right side surface, or the upper surface of the body housing 22. In any of these cases, a direction along which the battery B is slid to be attached or detached may be set in an arbitrary direction along the battery mount 22c, such as along the up-down direction, the left-right direction, or the front-rear direction.

In the chain saw 2 according to the embodiment, in the discharge amount adjusting mechanism 126, the adjustment pin 94 may protrude to outside the body housing 22 by penetrating through the adjustment opening 124, and the tool groove 94a may be disposed outside the body housing 22. Alternatively, the discharge amount adjusting mechanism 126 may be provided with a lever or a dial exposed to outside the body housing 22, and this lever or dial may be mechanically connected to the adjustment pin 94 through the adjustment opening 124.

The chain saw 2 according to the embodiment may be supplied with power through a power cord, without the battery B attached thereto.

The chain saw 2 according to the embodiment may be provided with an engine, instead of the motor 34, as a prime mover configured to rotate the sprocket 56. In this case, the output shaft 50 connected to the sprocket 56 may be rotated by actuation of the engine.

What is claimed is:

1. A chain saw comprising
    a motor configured to rotate a saw chain about a guide bar of the chain saw;
    a control unit configured to control a voltage applied to the motor;
    a body housing that houses the motor and the control unit;
    a battery detachably attached to the body housing; and
    a top handle provided above the body housing,
    wherein
    the control unit includes an inverter circuit provided with a switching element and a control circuit configured to control operation of the switching element,
    the control unit is disposed above the battery,
    in a rear view of the chain saw in a state where the chain saw is placed on a mount surface, the battery and the control unit do not overlap, and
    in a top view of the chain saw in the state where the chain saw is placed on the mount surface, the battery and the control unit overlap at least partially.

2. The chain saw according to claim 1, wherein
    in the rear view of the chain saw in the state where the chain saw is placed on the mount surface, the top handle and the battery do not overlap, and
    in the top view of the chain saw in the state where the chain saw is placed on the mount surface, the top handle and the battery overlap at least partially.

3. The chain saw according to claim 1, wherein the battery is detachable by being slid in a left-right direction relative to the body housing.

4. The chain saw according to claim 1, wherein
    in the top view of the chain saw in a state where the chain saw is placed on the mount surface, the motor and the battery do not overlap, and the motor and the control unit do not overlap, and
    in the rear view of the chain saw in the state where the chain saw is placed on the mount surface, the motor and the battery overlap at least partially, and the motor and the control unit overlap at least partially.

5. The chain saw according to claim 4, wherein the battery and the control unit are disposed on a rear side relative to the motor.

6. The chain saw according to claim 4, wherein in the top view of the chain saw in the state where the chain saw is placed on the mount surface, the motor is disposed within a range of 1.2 times a width of the battery in a left-right direction from a center line of the battery in the left-right direction.

7. A chain saw comprising:
    a motor configured to rotate a saw chain about a guide bar of the chain saw;
    a control unit configured to control a voltage applied to the motor;
    a body housing that houses the motor and the control unit;
    a battery detachably attached to the body housing; and
    a top handle provided above the body housing,
    wherein
    the control unit includes an inverter circuit provided with a switching element and a control circuit configured to control operation of the switching element,
    the control unit is disposed above the battery,
    in a rear view the chain saw in a state where the chain saw is placed on a mount surface, the battery and the control unit do not overlap,
    in a top view of the chain saw in the state where the chain saw is placed on the mount surface, the battery and the control unit overlap at least partially,
    a hand rest is provided in a vicinity of a portion of the body housing where a rear end of the top handle connects to the body housing, and
    the control unit is disposed inside the hand rest.

8. The chain saw according to claim 7, wherein
in the rear view of the chain saw in the state where the chain saw is placed on the mount surface, the top handle and the battery do not overlap, and
in the top view of the chain saw in the state where the chain saw is placed on the mount surface, the top handle and the battery overlap at least partially.

9. The chain saw according to claim 7, wherein the battery is detachable by being slid in a left-right direction relative to the body housing.

10. The chain saw according to claim 7, wherein
in the top view of the chain saw in a state where the chain saw is placed on the mount surface, the motor and the battery do not overlap, and the motor and the control unit do not overlap, and
in the rear view of the chain saw in the state where the chain saw is placed on the mount surface, the motor and the battery overlap at least partially, and the motor and the control unit overlap at least partially.

11. The chain saw according to claim 10, wherein the battery and the control unit are disposed on a rear side relative to the motor.

12. The chain saw according to claim 10, wherein in the top view of the chain saw in the state where the chain saw is placed on the mount surface, the motor is disposed within a range of 1.2 times a width of the battery in a left-right direction from a center line of the battery in the left-right direction.

\* \* \* \* \*